(12) United States Patent
Shinavski et al.

(10) Patent No.: US 11,046,618 B2
(45) Date of Patent: Jun. 29, 2021

(54) DISCRETE SOLIDIFICATION OF MELT INFILTRATION

(71) Applicants: Rolls-Royce High Temperature Composites Inc., Cypress, CA (US); Rolls-Royce Corporation, Indianapolis, IN (US)

(72) Inventors: Robert Shinavski, Mission Viejo, CA (US); Joseph Doyle, Fountain Valley, CA (US); Andrew Ritchey, Lafayette, IN (US); Stephen Harris, Long Beach, CA (US)

(73) Assignees: ROLLS-ROYCE CORPORATION, Indianapolis, IN (US); ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 148 days.

(21) Appl. No.: 15/967,664

(22) Filed: May 1, 2018

(65) Prior Publication Data
US 2018/0312442 A1   Nov. 1, 2018

Related U.S. Application Data

(60) Provisional application No. 62/492,471, filed on May 1, 2017.

(51) Int. Cl.
*C23C 2/00*   (2006.01)
*C04B 35/80*   (2006.01)
(Continued)

(52) U.S. Cl.
CPC .......... *C04B 35/806* (2013.01); *C04B 35/573* (2013.01); *C04B 35/62878* (2013.01);
(Continued)

(58) Field of Classification Search
CPC ................. C23C 2/00; C23C 6/00
See application file for complete search history.

(56) References Cited

U.S. PATENT DOCUMENTS 4,636,267 A * 1/1987 Jacobsen ................. C22F 1/186
148/570
5,607,007 A   3/1997 Chandley
(Continued)

FOREIGN PATENT DOCUMENTS

CA   2089277 A1   9/1993

OTHER PUBLICATIONS

"A Simple Process to Remove Boron From Metallurgical Grade Silicon," by Chandra P. Khattak et al., Solar Energy Materials & Solar Cells 74 (2002) pp. 77-89.

*Primary Examiner* — Hai Y Zhang
(74) *Attorney, Agent, or Firm* — Brinks Gilson & Lione

(57) ABSTRACT

A ceramic matrix composite (CMC) is formed by infiltrating a metal or alloy into a fiber preform in a reactor or furnace that is separated into multiple discrete temperature zones. The gradual cooling of the CMC is controlled, such that upon solidification, a narrow, planar, solidification front is created which allows the expanding metal or alloy to move into a hotter section of the fiber preform, opposed to the surface of the CMC. A discrete solidification front is established that moves through the ceramic matrix composite (CMC) as the composite cools.

11 Claims, 5 Drawing Sheets

(51) Int. Cl.
*C04B 35/628* (2006.01)
*C04B 35/657* (2006.01)
*C04B 35/573* (2006.01)
*C04B 35/64* (2006.01)

(52) U.S. Cl.
CPC ............ C04B 35/64 (2013.01); C04B 35/657 (2013.01); *C04B 2235/3826* (2013.01); *C04B 2235/524* (2013.01); *C04B 2235/5224* (2013.01); *C04B 2235/5228* (2013.01); *C04B 2235/5236* (2013.01); *C04B 2235/5244* (2013.01); *C04B 2235/5248* (2013.01); *C04B 2235/5264* (2013.01); *C04B 2235/616* (2013.01); *C04B 2235/66* (2013.01)

(56) References Cited

U.S. PATENT DOCUMENTS

| | | |
|---|---|---|
| 6,276,432 B1 | 8/2001 | Thompson et al. |
| 6,896,030 B2 | 5/2005 | Soderstrom et al. |
| 2005/0022959 A1* | 2/2005 | Soderstrom .......... B22D 27/045 164/122.1 |
| 2016/0083305 A1* | 3/2016 | Goetz ................ C04B 41/5096 501/88 |

* cited by examiner

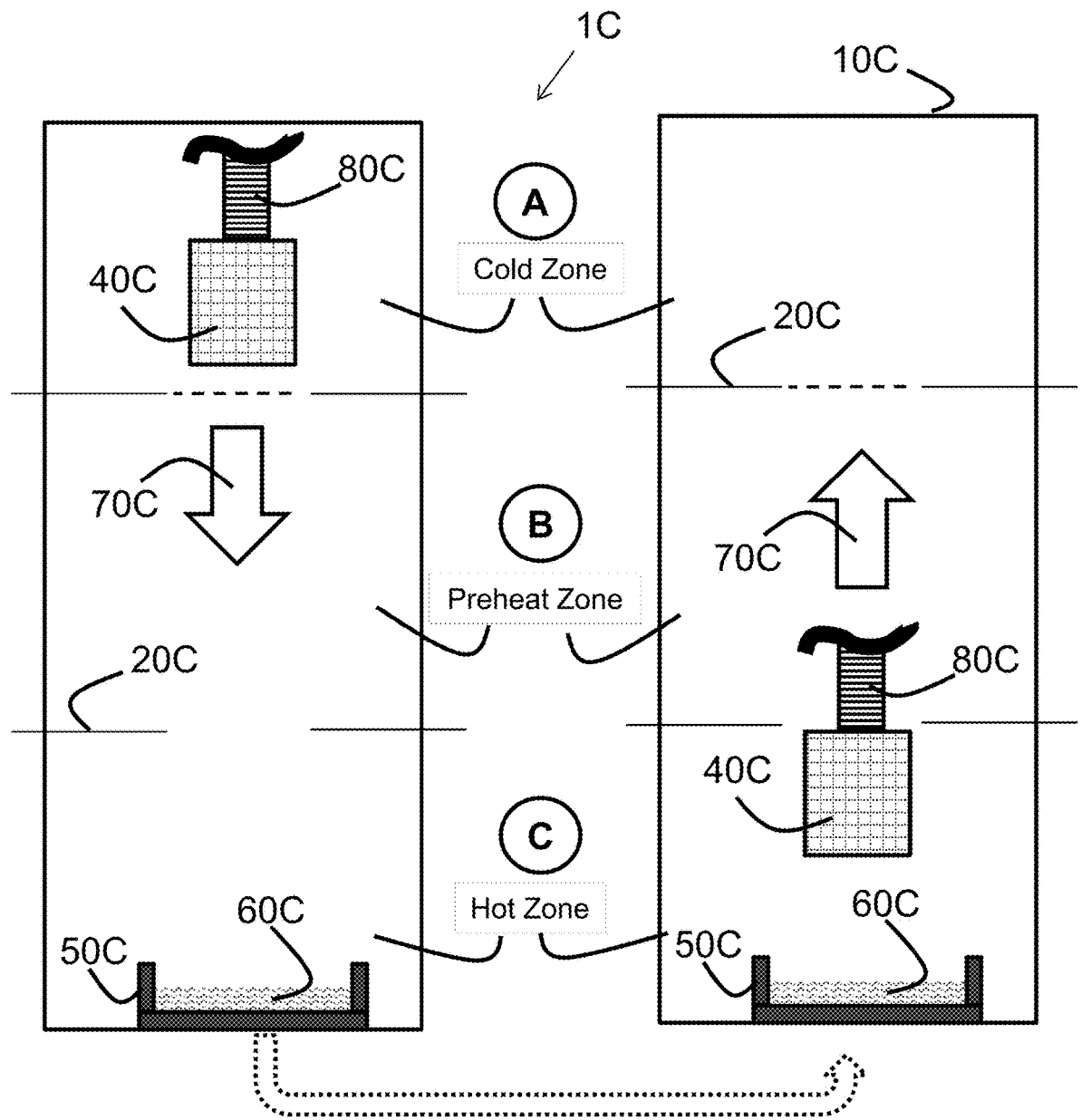
Figure 4A                    Figure 4B

DISCRETE SOLIDIFICATION OF MELT INFILTRATION

CROSS-REFERENCE TO RELATED APPLICATIONS

This application claims priority to U.S. Provisional Application No. 62/492,471 filed May 1, 2017, the entire content of which is incorporated herein by reference.

TECHNICAL FIELD

This disclosure relates generally to the preparation of a ceramic matrix composite and more particularly, to a method of infiltrating a ceramic fiber preform.

BACKGROUND

The statements in this section merely provide background information related to the present disclosure and may not constitute prior art.

Ceramic matrix composites (CMCs), which include ceramic fibers embedded in a ceramic matrix, exhibit a combination of properties that make them promising candidates for industrial applications that demand excellent thermal and mechanical properties along with low weight, such as gas turbine engine components. Typically, one of the final steps in the fabrication of a ceramic matrix composite is melt infiltration, in which a molten material is infiltrated into a porous preform that includes the ceramic fibers. The melt infiltration process may be time consuming in the case of large components or parts having a complex geometry.

The melt infiltration process may also lead to the excessive use of finishing operations in order to remove surface defects that are formed during the process. For example, melt infiltration of silicon may result in the formation of areas of surface silicon.

BRIEF DESCRIPTION OF THE DRAWINGS

In order that the disclosure may be well understood, there will now be described various forms thereof, given by way of example, reference being made to the accompanying drawings, in which:

FIGS. 4A and 4B are schematic representations of a continuous reactor that highlights the process used to prepare a ceramic matrix composite (CMC) according to FIG. 3.

Figure 1:
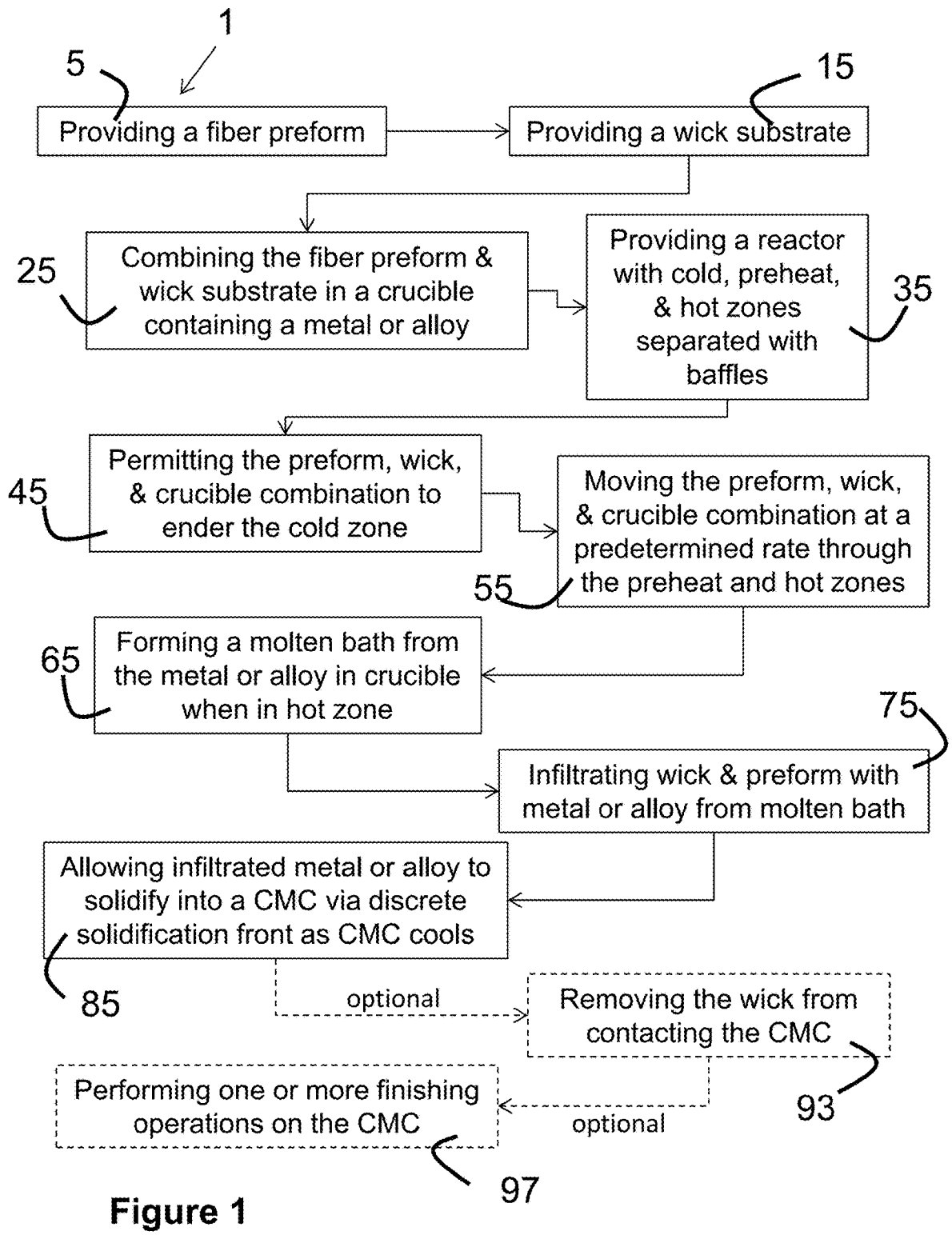
FIG. 1 is a flow chart of a process of preparing a CMC according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or the application or use thereof. For example, the method of preparing ceramic matrix composites (CMCs) according to the teachings contained herein is described throughout the present disclosure in conjunction with several specific reactor set-ups in order to more fully illustrate the composition and the use thereof. The incorporation and use of such a method of preparing other CMCs in other reactor designs is contemplated to be within the scope of the present disclosure. It should be understood that throughout the description, corresponding reference numerals indicate like or corresponding parts and features.

The present disclosure generally provides a method of producing a ceramic matrix composite (CMC). CMCs are generally made from a lay-up of a plurality of continuous ceramic fibers, formed to a desired shape. At this stage in the production of a CMC component, the lay-up is generally known as a ceramic fiber preform, fiber preform, or preform. The fiber preform, which may be partially-rigid or non-rigid, may be constructed in any number of different configurations. For example, the preform may be made of filament windings, braiding, and/or knotting of fibers, and may include two-dimensional and three-dimensional fabrics, unidirectional fabrics, and/or nonwoven textiles. The fibers used in the preform, furthermore, may comprise any number of different materials capable of withstanding the high processing temperatures used in preparing and operating CMCs, such as, but not limited to, carbon fibers, ceramic fibers (e.g., silicon carbide, alumina, mullite, zirconia, or silicon nitride), which can be crystalline or amorphous. The ceramic fibers may be suitably coated by various methods.

During preparation of the CMC, the preform can be infiltrated with a matrix precursor material. The matrix precursor material can comprise any number of materials such as, but not limited to, polymers, metals, and ceramics, including without limitation silicon, silicon carbide, alumina, mullite, zirconia, and combinations thereof (e.g., silicon/silicon carbide, etc.). In most embodiments, the matrix precursor material comprises ceramic particles. The preform can be infiltrated with the matrix precursor material using any number of processes, for example by infiltration of the preform with a slurry of the matrix precursor material under elevated or reduced pressure, by chemical vapor deposition or chemical vapor infiltration, by pyrolysis (e.g., of a pre-ceramic polymer), by chemical reactions, sintering, melt infiltration, and electrophoretic deposition (e.g., of a ceramic powder). Finally, the CMC may be machined, if necessary to bring the geometry of the part into the required specifications.

The present disclosure relates to the preparation of a ceramic matrix composite (CMC) and more particularly, to a method that may provide several benefits, such as a reduced content of impurities, increased dimensional control of the near-net-shape component, reduced surface roughness, improved control over the magnitude and location of residual stresses imparted by silicon solidification, and reduced cycle time compared to conventional melt infiltration processes. More specifically, the method of the present disclosure, leverages discrete temperature zones through which the combination of fiber preform, wick material, metal or alloy, and crucible are moved. The part may be infiltrated with the metal or alloy when the crucible, metal or alloy, and part transitions from the cold zone to the hot zone. Upon entry into the cold section and subsequent solidification, a narrow, non-planar or discrete, solidification front is created which allows the expanding metal or alloy (e.g., silicon or silicon/silicon carbide, etc.) to move into a hotter section of the fiber preform, opposed to the surface of the part. Adjusting the transfer rate at which the part moves through the various temperature zones may be used to reduce the amount of time each section of the part is in the hot zone of the reactor or furnace, if there is an adverse effect on the properties, such as fiber strength, by staying at the infiltration temperature for any given length of time. A second wick material may be used on the opposite end of the fiber preform in order to receive the excess metal or alloy when the last bit of the infiltrated preform enters the "cold zone". An alternative method of introducing a metal or alloy to the fiber preform would be to submerge the preform in a molten pool of the metal or alloy and then proceed with a similar solidification method as previously described above and further defined herein.

Another potential benefit of the method performed according to the teachings of the present disclosure is that metal refinement during solidification can push impurities out of the part and into the wick material. These impurities can include impurities that are present in other constituents and become dissolved in the metal or alloy during the process, impurities that are present in the source of the metal, or alloying agents that are purposely added to the metal to modify its properties, such as melt temperature, viscosity and/or wetting, to name a few. Thus the refinement of the metal or alloy may allow for a wider purity range of the metal and constituents to be utilized and also allows engineering of the metal properties through alloying that is transient to the process.

For purposes of promoting an understanding of the principles of the present disclosure, reference will now be made to the embodiments illustrated in the drawings, and specific language will be used to describe the same. It will nonetheless be understood that no limitation of the scope of the present disclosure is intended by the illustration and description of certain embodiments herein. In addition, any alterations and/or modifications of the illustrated and/or described embodiment(s) are contemplated as being within the scope of the present disclosure. Further, any other applications of the principles of the present disclosure, as illustrated and/or described herein, as would normally occur to one skilled in the art to which the disclosure pertains, are contemplated as being within the scope of thereof.

Referring now to FIG. 1 a method 1 of producing a ceramic matrix composite (CMC) is provided that generally comprises, consists of, or consists essentially of the following steps. A fiber preform as previously described above and conventionally known is provided 5. The fiber preform may comprise a plurality of fibers, wherein the preform is shaped such that it resembles the final configuration desired for the ceramic matrix composite (CMC). One or more wick materials is provided 15, such that the wick material is in contact with a surface of the fiber preform. The fiber preform and the wick material are combined 25 with a crucible in a manner in which at least of portion of the preform and the wick material are located within the confines of the crucible. The crucible contains a metal, alloy, or combination thereof. A reactor that comprises one or more cold zones, one or more preheat zones, and one or more hot zones is provided 35 with each of the zones being separated from each other by one or more thermal barriers or baffles. The combination of the fiber preform, the wick material, and the crucible are permitted 45 to enter the cold zone of the reactor. The combination of the fiber preform, the wick material, and the crucible are moved or transferred 55 through the cold zone, the preheat zone, and the hot zone at a predetermined rate. This predetermined rate may be variable across each of the different temperature zones. While in the hot zone, the metal or alloy in the crucible forms a molten metal bath 65. The metal or alloy from the molten metal bath may infiltrate 75 the wick material and the fiber preform. The metal or alloy that has infiltrated in to the fiber preform is allowed to solidify 85, thereby, forming the ceramic matrix composite (CMC). A discrete solidification front is created when the infiltrated metal or alloy begins to cool during the transition from a hot section to a cold or pre-heat section. The use of this method 1, establishes a discrete solidification front that moves through the ceramic matrix composite (CMC) as the composite cools.

Still referring to FIG. 1, when desirable, the method may further comprise removing 93 the wick material from being in contact with the ceramic matrix composite (CMC). In addition, one or more finishing operations may be performed 97 on the CMC. These finishing operations 97 may include, but not be limited to, grinding, sanding, cutting, trimming, densification, brazing, or surface treatment, to name a few.

Figure 2A:
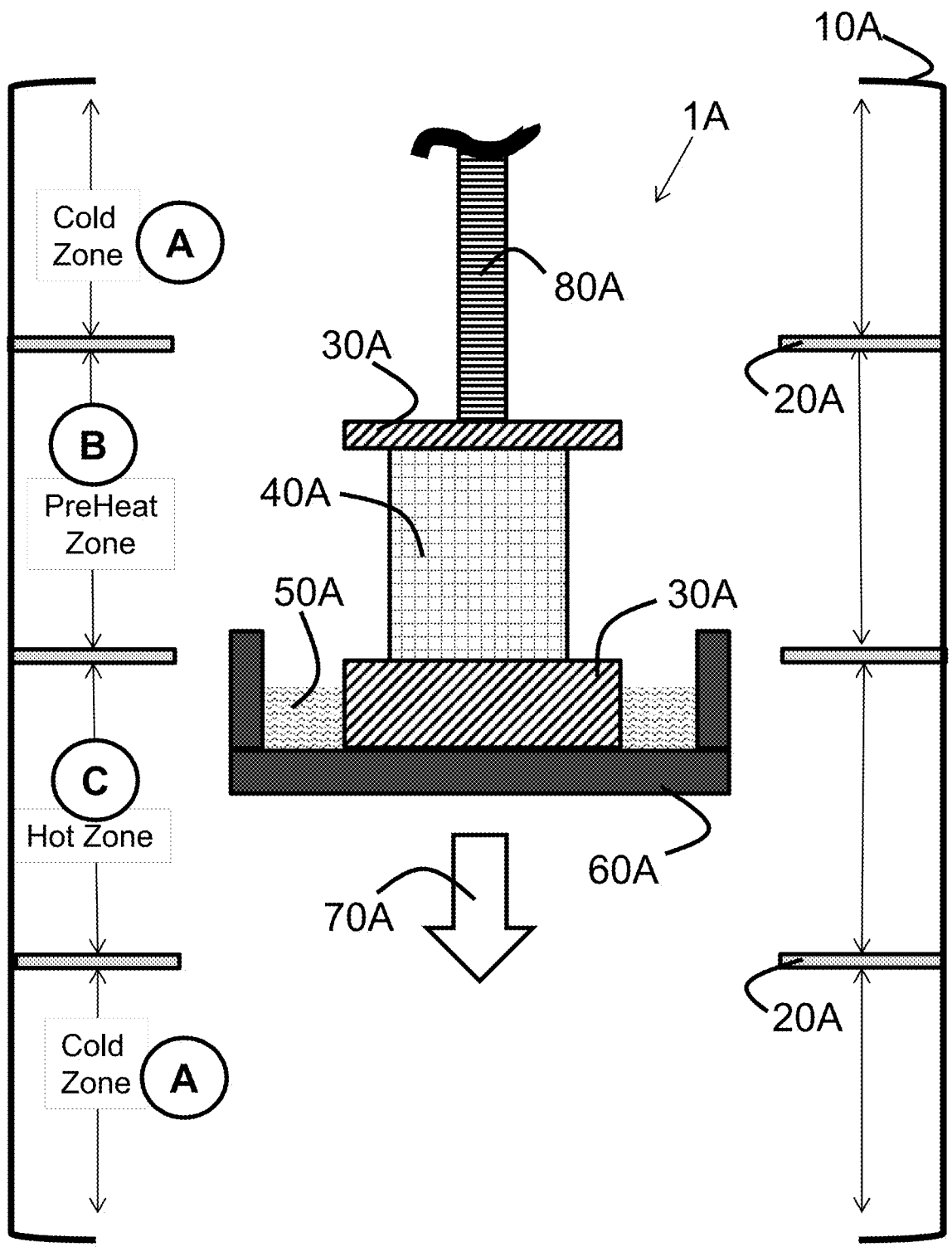
FIG. 2A is a schematic representation of a continuous reactor that highlights specific aspects of the process used to prepare a ceramic matrix composite (CMC according to FIG. 1)
Figure 2B:
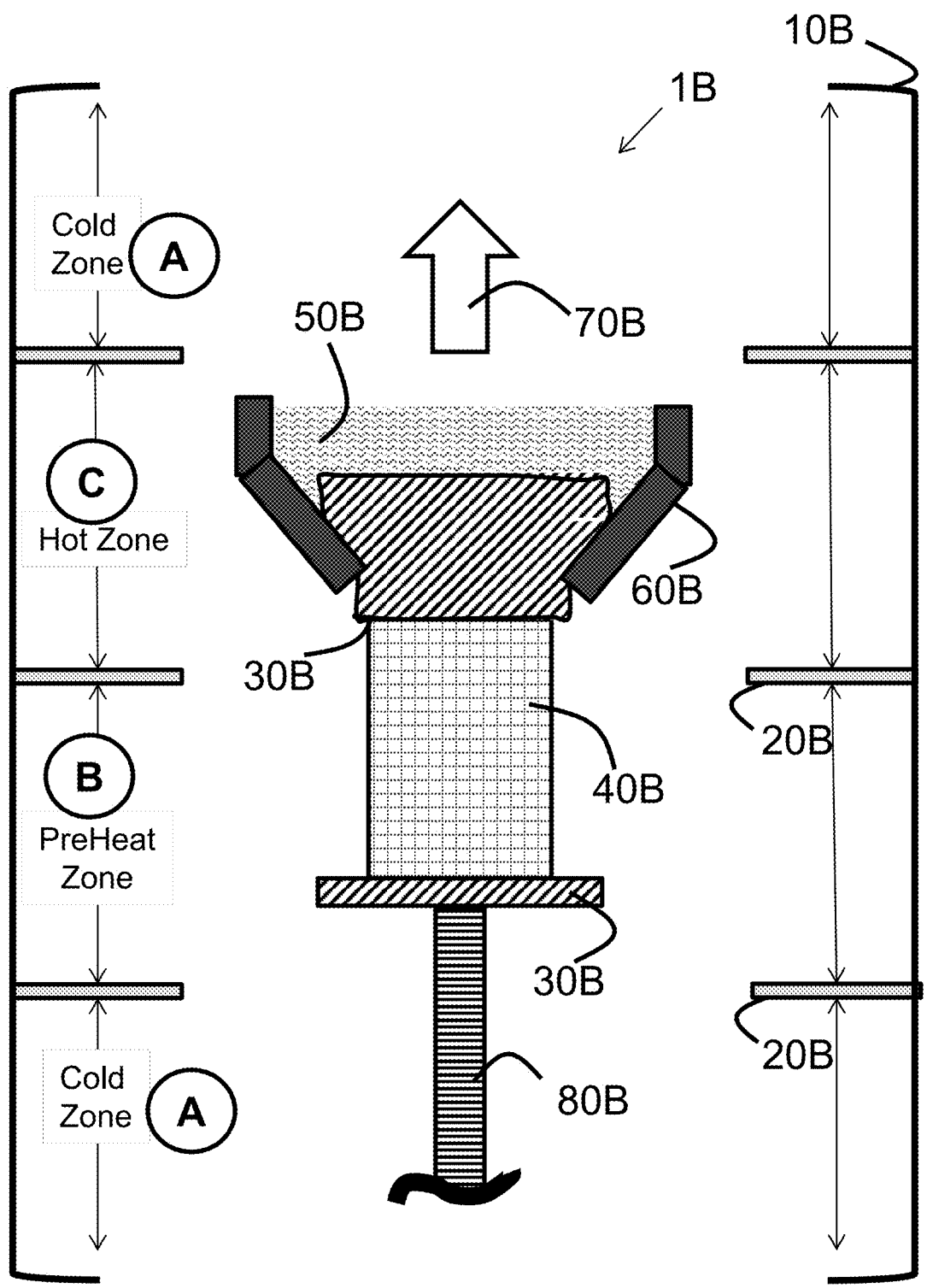
FIG. 2B is a schematic representation of another continuous reactor that further highlight specific aspect of the process used to prepare a ceramic matrix composite (CMC according to FIG. 1)

Referring now to FIGS. 2A and 2B, the furnace or reactor 10(A, B) used in the method 1A may comprise (A) one or more cold zones, (B) at least one preheat zone, and (C) at least one hot zone. Each of the zones (A, B, C) may be separated by at least one thermal barrier or baffle 20(A, B). Each of the zones (A, B, C) is capable of being placed under a vacuum and heated. The baffles 20(A, B) are capable of maintaining the prescribed temperature difference over a distance of less than 6 inches; alternatively, over a length of less than 3 inches; alternatively, over a length of less than 1 inch.

According to one aspect of the present disclosure as shown in FIG. 2A, a ceramic fiber preform 40A is combined with two wick materials 30A. Each of the wick materials 30A are located on opposite surfaces of the fiber preform 40A. The wick material 30A that is in contact with the lower portion or bottom of the fiber preform 40A is positioned within the confines of a crucible 60A, such that at least a portion of the wick material 30A contact with metal or an alloy 50A that is used to form a molten metal bath 50A. A $2^{nd}$ wick material 30A is used to capture excess metal or alloy as it is solidifying after infiltration during the cool down process. This $2^{nd}$ wick material 30A is placed in contact with the upper portion or top of the fiber preform 40A and is attached to a means 80A capable of moving or transferring the combination of the fiber preform 40A, wick materials 30A, crucible 60A, and metal or alloy 50A through the various zones (A, B, C) of the reactor or furnace 10A. The direction of travel 70A causes the combination of the preform 40A, wick materials 30A, crucible 60A, and metal 50A to move through a first cold zone (A), a preheat zone (B), a hot zone (C), and a second cold zone (B).

According to another aspect of the present disclosure as shown in FIG. 2B, a ceramic fiber preform 40B is combined with two wick materials 30B. Each of the wick materials 30B are located on opposite surfaces of the fiber preform 40B. In this case, the wick material 30B that is in contact with the upper portion or top of the fiber preform 40B may be positioned within the confines of a crucible 60B, such that at least a portion of the wick material 30B contact with metal or an alloy 50B that is used to form a molten metal bath 50B. Alternatively, the wick material 30B may include a hollowed or cut-out area in which the metal or alloy 50B may reside. In fact, this wick material 30B may be formed such that it is part of the crucible 60B, such as the bottom thereof as depicted in FIG. 2B. A $2^{nd}$ wick material 30A is used to capture excess metal or alloy as it is solidifying after infiltration during the cool down process. This $2^{nd}$ wick material 30B, which is in contact with the lower portion or bottom of the fiber preform 40B, is attached to a means 80B capable of moving or transferring the combination of the fiber preform 40B, wick materials 30B, crucible 60B, and metal or alloy 50B through the various zones (A, B, C) of the reactor or furnace 10B. The direction of travel 70B causes the combination of the preform 40B, wick materials 30B, crucible 60B, and metal 50B to travel or move through a first cold zone (A), a preheat zone (B), a hot zone (C), and a second cold zone (B) of the reactor or furnace 10B.

Referring now to both FIGS. 2A and 2B, the fiber preform 40(A, B) may comprise a plurality of fibers that are made from any inorganic material stable at processing temperatures above about 1,000° C. and compatible with the temperature of the molten metal or alloy used to infiltrate the pores or free volume in the fiber preform 40(A, B). The plurality of fibers may be woven into a shape that resembles the ceramic matrix composite (CMC) to be produced. Several specific examples of fibers include, without limitation, silicon carbide (SiC) fibers, silicon nitride fibers, alumina fibers, mullite fibers, zirconia fibers, carbon or graphite fibers, or a combination thereof. Alternatively, the fibers are SiC fibers, such as those commercially available under the designation Hi-Nicalon fibers and SYLRAMIC® fibers (registered trademark of COI Ceramics, Inc., San Diego, Calif.). The ceramic fibers may include chopped fibers, continuous fibers, woven fabrics or combinations thereof that are laid up, fixed, and shaped into the configuration of a desired component.

When desirable, the fiber preform 40(A, B) may further comprise other additives or processing aids. For example, the inorganic fibers in the preform 40(A, B) may be treated by applying a coating or coatings to provide a compliant layer at the interface between the fibers and the matrix material composed of subsequently introduced particles or components of the molten metal or alloy infiltrant. This compliant layer may enhance the toughness of and crack deflection in the final ceramic matrix composite (CMC) and/or act as a barrier layer to prevent reaction of the reinforcing fibers with the molten metal or alloy infiltrant. Suitable coatings include, but are not limited to, carbon, aluminum nitride, boron nitride, silicon doped boron nitride, silicon nitride, silicon carbide, boron carbide, metal borides, transition metal silicides, transition metal oxides, transition metal silicates, rare earth metal silicates and mixtures and combinations thereof. If used, in various embodiments the fiber coating may have a thickness of about 0.05 micrometers (μm) to 3 μm, alternatively, about 0.1 μm to about 1 μm. A coated fiber preform may further include rigidization with a ceramic material accomplished through the use of any conventional methods, including without limitation, chemical vapor infiltration with silicon carbide, silicon nitride, or the like.

The ceramic fibers in the preform 40(A, B) may include individual fiber filaments or a bundle and/or a tow of filaments. The filaments in each bundle or tow may be braided or otherwise arranged. Each of the fibers is individually selected and may be of the same or different composition and/or diameter. Alternatively, the fibers are the same in at least one of said composition and/or diameter. The ceramic fiber filaments may have a diameter that is between about 1 micrometer (μm) to about 200 μm; alternatively, about 3 μm to about 100 μm; alternatively, about 5 μm to about 30 μm; alternatively, about 10 μm to about 20 μm.

As used herein the term "metal or alloy" is intended to refer to the main matrix infiltrant, which may comprise any number of materials such as, but not limited to, polymers, metals, and ceramics. Several specific examples of metals that may be used to slurry infiltrate the fiber preform may comprise, without limitation, aluminum, silicon, nickel, titanium, or mixtures and alloys thereof. Several specific examples of ceramics that may be used to infiltrate the fiber preform may include, without limitation, silicon, alumina, mullite, zirconia, and combinations thereof. Alternatively, the metal or alloy infiltrant may react upon infiltration to form additional ceramic phases that were not introduced as a slurry (e.g., silicon carbide). The metal or alloy may be initially provided in any physical form, including, but not limited to powders, particles, or lumps. When desirable, the metal or alloy particles may be combined with other additives or process aids used in forming the molten metal bath.

Any heat source may be used that is capable of sufficiently heating the region or zone to a predetermined target temperature. The preheat zone, the hot zone, and optionally, the cold zone may also be placed under a vacuum. The predetermined temperature in the cold zone is between about ambient or room temperature up to about 200° C. below the melting temperature of the metal or alloy. The predetermined temperature of the preheat zone is between about 25° C. to about 150° C. lower than the melting temperature of the metal or alloy. The predetermined temperature in the hot zone is about 20° C. to about 50° C. greater than the melting temperature of the metal or alloy.

The temperature in the hot zone is sufficient to heat the fiber preform to a temperature that is capable of sustaining the propagation of a wave front through the structure in the fiber preform until the preform is adequately infiltrated with the metal or alloy infiltrant. Alternatively, for silicon or silicon alloy infiltration, the predetermined target temperature of the hot zone is about 1400° C. to about 1600° C.; alternatively, about 1400° C. to about 1500° C.; alternatively, about 1420° C. to about 1470° C. Under these conditions, the duration of time associated with the infiltration of the wick material and/or fiber preform can be between about 15 minutes and 4 hours, or about 60 minutes to about 180 minutes. The infiltration process can optionally be carried out under full vacuum (e.g., about 1 Torr), but in other embodiments the infiltration may be carried out under partial vacuum (e.g., less than atmospheric pressure) or in an inert gas under atmospheric pressure.

The combination of the fiber preform, the wick material, and the crucible are coupled with and moved by a rod, a pulley system, an actuator system, a cable, or the like. When desirable the combination of the fiber preform, wick material, and crucible may be supported or carried by a suitable support structure such as for example and without limitation base plate or other suitable support structure.

The predetermined rate at which the combination is moved may range between about 0.2 millimeters per minute (mm/min) to about 8.2 mm/minute (20 in/hr); alternatively, about 0.4 mm/min (1 in/hr) to about 4.2 mm/min (10 in/hr); alternatively, about 1.27 mm/min (3 in/hr) to about 2.96 mm/min (7 in/hr); alternatively, at least about 0.4 mm/min (1 in/hr). The overall time to move the combination of the preform, wick materials, crucible, and metal or alloy bath through all of the zones (A, B, C) of the furnace or reactor is between about 1 hour to about 48 hours; alternatively, about 3 hours to 36 hours; alternatively, about 5 hours to 25 hours.

The infiltration of the molten metal or alloy into the wick material and into the fiber preform may be due to capillary forces, gravity, or a combination thereof. In order to enhance the capillary forces to pull the metal or alloy infiltrant into the pores of the fiber preform, the wick material has larger pores and is more porous or has a larger pore volume than the fiber preform. The wick material may comprise materials made from carbon fiber or ceramic fiber woven or non-woven textiles. The wicks 26 may also be porous carbon or ceramic foam or a similar material. Alternatively, the wick comprises a felt material, carbon foam, or a textile.

During infiltration a wavefront of the metal or alloy is established and advances through the structure of the fiber preform and occupies the free volume or interstices between the fibers until the preform is sufficiently densified. The preform is sufficiently densified when less than about 5%; alternatively, less than about 3%; alternatively less than about 1% porosity remains based on the overall porosity of the fiber preform.

As the ceramic matrix composite (CMC) is gradually cooled to ambient or room temperature, a discrete solidification front is established that moves through the ceramic matrix composite (CMC). This discrete solidification gradient may move from the top to the bottom of the ceramic matrix composite (see FIG. 2B) or from the bottom to the top of the CMC (see FIG. 2A). More specifically, as the temperature of a region of the CMC begins to cool (e.g., lower temperature), the solidification front moves towards the region of the CMC that is at a higher temperature.

The method conducted according to the teachings of the present disclosure also benefits from lowering the incorporation of impurities arising from the molten metal bath. The overall level of impurities arising from the infiltration of the molten metal or alloy is less than 30 ppm; alternatively, less than 20 ppm; alternatively, less than 10 ppm. These impurities may comprise metal or nonmetallic elements, including without limitation, aluminum, iron, titanium, calcium, boron, and phosphorous, to name a few.

The final ceramic matrix composite may comprise about 20 vol. % to about 60 vol. % fibers and about 1 vol. % to about 80 vol. % metal or alloy matrix. Alternatively, the final ceramic matrix composite may comprise about 30 vol. % to about 50 vol. % fibers and about 5 vol. % to about 70 vol. % metal or alloy matrix. The final CMC includes no macroscopic porosity, which in this application means pores with an average pore size of less than about 200 µm, or less than about 50 µm, or less than about 2 µm, and includes a porosity of less than about 5%, or less than about 3%, or less than about 1% as previously described above. Alternatively, the pores may be described with respect to pore volume, wherein the total pore volume may be less than about 50 mm$^3$; alternatively, less than 10 mm$^3$; alternatively, less than about 1 mm$^3$.

Figure 3:
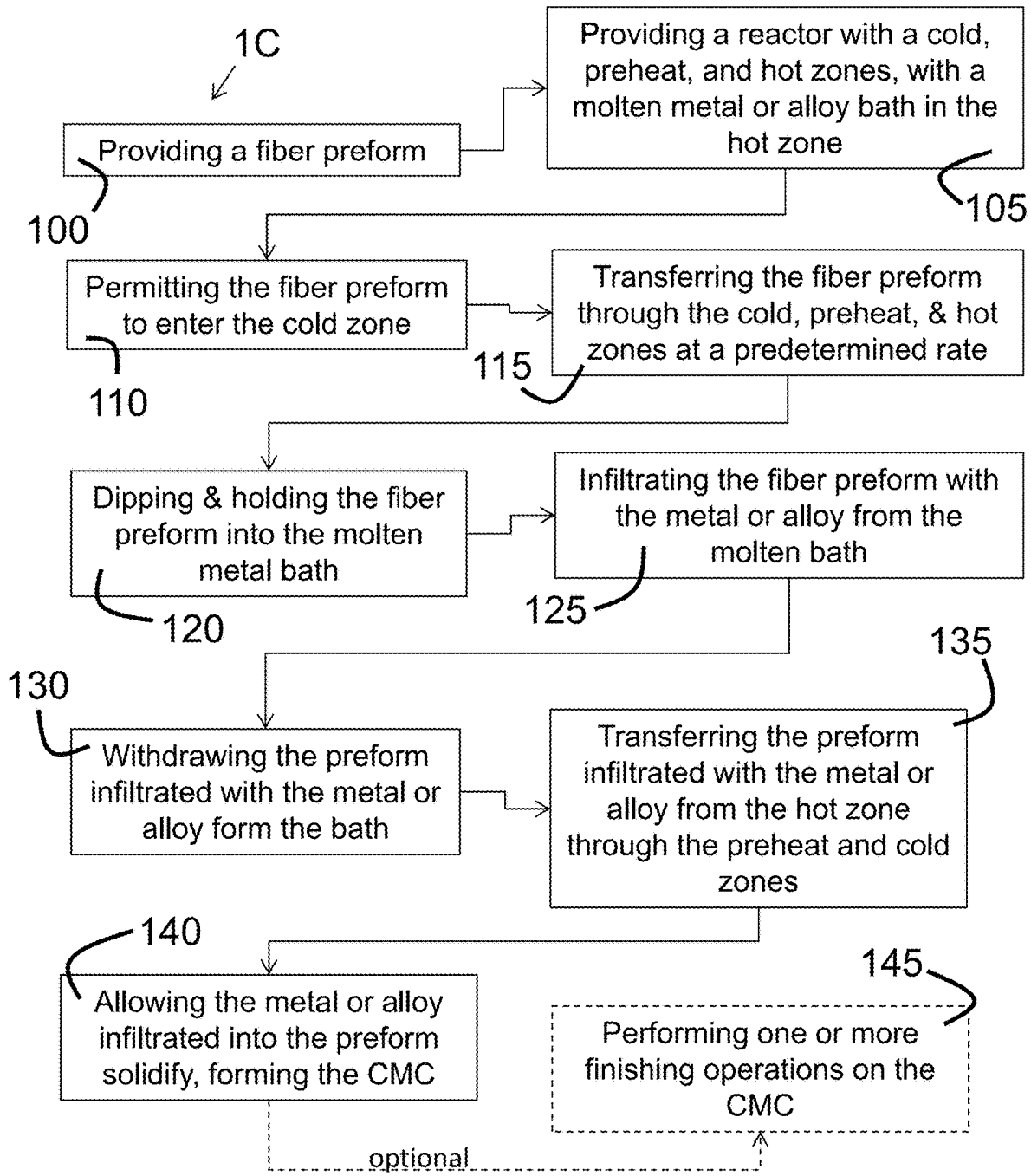
FIG. 3 is a flow chart describing another process of preparing a CMC according to the teachings of the present disclosure.

Referring now to FIG. 3, the method 1C of producing a ceramic matrix composite (CMC) may comprise, consist of, or consist essentially of the following steps. A fiber preform as previously described above and conventionally known is provided 100. A reactor that comprises at least one cold zone, at least one preheat zone, and at least one hot zone is provided 105 with each of the zones being separated from each other by one or more thermal barriers or baffles. A molten metal or alloy bath is located within the hot zone. The fiber preform, the wick material are permitted 110 to enter the cold zone of the reactor. The fiber preform is moved or transferred 115 through the cold zone, the preheat zone, and the hot zone at a predetermined rate. While in the hot zone, fiber preform is dipped and held 120 in the molten metal or alloy bath. The metal or alloy from the molten metal bath may infiltrate 125 the fiber preform. The fiber preform infiltrated with the metal or alloy is withdrawn 130 from the molten metal bath. The fiber preform with the infiltrated metal or metal alloy is transferred 135 from the hot zone through the preheat zone and the cold zone. The metal or alloy that has infiltrated in to the fiber preform is allowed to solidify 140, thereby, forming the ceramic matrix composite (CMC). The use of this method 1C, establishes a discrete solidification front that moves through the ceramic matrix composite (CMC) as the composite cools. When desirable, one or more finishing operations may be performed 145 on the CMC. These finishing operations 145 may include, but not be limited to, grinding, sanding, cutting, trimming, densification, brazing, or surface treatment, to name a few.

Referring now to FIGS. 4A and 4B, the furnace or reactor 10(C) used in the method 1C may comprise (A) a cold zone, (B) a preheat zone, and (C) a hot zone. Each of the zones (A, B, C) may be separated by at least one thermal barrier or baffle 20C. Each of the zones (A, B, C) is capable of being placed under a vacuum and heated. The baffles 20(C) are capable of maintaining the prescribed temperature difference over a distance of less than 6 inches; alternatively, over a length of less than 3 inches; alternatively, over a length of less than 1 inch.

Still referring to FIG. 4A, a fiber preform 40C is coupled with and moved by a rod, a pulley system, an actuator system, a cable, or the like 80C through the various temperature zones (A, B, C). The direction of travel 70C is shown to start in the cold zone (A). This zone (A) is used to load the fiber preform 40C and may also be called the "antechamber". Once the fiber preform is loaded into the cold zone (A), the chamber may be evacuated or placed under vacuum. The cold zone (A) optionally may be purged with an inert atmosphere prior to evacuation. The pre-heat zone (B) and hot zone (C) are under a full or partial vacuum. The fiber preform 40C is moved 80C through the preheat zone, which presoaks the preform 40C at a higher temperature so that the temperature throughout the preform can easily be equilibrated at a temperature suitable for the infiltration of the metal or metal alloy.

The fiber preform 40C is transferred or moved 80C from the preheat zone (B) into the hot zone (C). The temperature of the preform 40C is allowed to equilibrate. A crucible 50C is located at or near the bottom of the reactor or furnace 10C. This crucible 50C may be integrally formed as part of the reactor 10C or reversibly removable therefrom. The crucible 50C contains the metal or alloy, which upon melting forms the molten metal bath 60C. The temperature in the hot zone (C) is selected such that the metal or alloy forms the molten metal bath 60C. The fiber preform 40C is dipped into and allowed to soak in the molten metal bath 60C for a predetermined amount of time. This amount of time is dependent upon the time necessary for the molten metal or alloy to infiltrate the fiber preform 40C. Capillary forces draw or pull the molten metal or alloy from the bath 60C into the fiber preform 40C to form the ceramic matrix composite (CMC).

Referring now to FIG. 4B, the fiber preform 40C infiltrated with the metal or alloy is removed from the molten metal bath 60C and allowed to move 80C in the return direction 70C from the hot zone (C) through the preheat zone (B). As the fiber preform 40C infiltrated with the metal or alloy begins to cool planar solidification is initiated. A discrete solidification front is established that moves through the ceramic matrix composite (CMC) in the direction of higher temperature. In FIG. 4B, such a solidification front moves from the top of the infiltrated fiber preform 40C to the bottom thereof. The part is finally moved from the preheat zone (B) into the cold zone (C) or antechamber. The antechamber is then backfilled with air or an inert gas, thereby, bringing the pressure in said zone or chamber up to atmospheric pressure in order to remove the CMC from the reactor 10C.

One skilled in the art will understand that other variations to this method, which may involve modifications to the reactor or furnace are anticipated and do not exceed the scope of the present disclosure. For example, modifications to the heated zones, such as aligning the top surface of the molten metal bath with the thermal baffle between the hot zone and the preheat zone would allow the fiber preform infiltrated with the metal or alloy to achieve planar solidification immediately upon removal from the molten metal bath.

One benefit associated with the modified method of 1C as compared to the methods of 1A and 1C is that the supply of molten metal or alloy may remain inside the hot zone with occasional requirement of being added to or topped off. In addition, fiber preforms may be loaded and formed CMCs unloaded without requirement the placement of and subsequent removal of wick materials and/or crucible components.

The ceramic matrix composite (CMC) formed according to the method of the present disclosure may be shaped into a component for use in a variety of applications, including without limitation, applications in the aerospace and/or automotive industries. Ceramic matrix composites exhibit a combination of properties that make them applicable for use in a variety of industrial applications that demand excellent thermal and mechanical properties along with low weight, such as gas turbine engine components, for example.

For the purpose of this disclosure the terms "about" and "substantially" are used herein with respect to measurable values and ranges due to expected variations known to those skilled in the art (e.g., limitations and variability in measurements).

The recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

The terms "at least one" and "one or more of" an element are used interchangeably and may have the same meaning. These terms, which refer to the inclusion of a single element or a plurality of the elements, may also be represented by the suffix "(s)" at the end of the element. For example, "at least one fiber", "one or more fibers", and "fiber(s)" may be used interchangeably and are intended to have the same meaning.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject-matter of the disclosure may also relate, among others, to the following aspects:

1. A method of producing a ceramic matrix composite (CMC), the method comprising:
   providing a fiber preform;
   providing one or more wick materials such that the wick material is in contact with at least a portion of a surface of the fiber preform;
   combining the fiber preform and the wick material with a metal, alloy, or combination thereof; wherein the metal, alloy, or combination is contained within a hollowed-out region of the wick material or in a crucible;
   providing a reactor that comprises one or more cold zones, at least one preheat zone, and at least one hot zone; wherein each of the zones are separated from each other by one or more thermal barriers or baffles;
   permitting the combination of the fiber preform, the wick material, and the crucible to enter the cold zone of the reactor;
   transferring the combination of the fiber preform, the wick material, and the crucible through the cold zone, the preheat zone and the hot zone at a predetermined rate;
   forming a molten metal bath from the metal or alloy while the crucible is in the hot zone;
   infiltrating the wick material and the fiber preform with the metal or alloy from the molten metal bath; and
   allowing the metal or alloy that has infiltrated in to the fiber preform solidify, thereby, forming the ceramic matrix composite (CMC);
   wherein a discrete solidification front is established that moves through the ceramic matrix composite (CMC) as the composite cools.

2. The method according to aspect 1, wherein the method further comprises:
   removing the wick material from being in contact with the ceramic matrix composite (CMC); and
   performing one or more finishing operations on the ceramic matrix composite (CMC).

3. The method according to any of aspects 1 to 2, wherein the fiber preform comprises a plurality of silicon carbide (SiC) fibers, silicon nitride fibers, alumina fibers, mullite fibers, zirconia fibers, carbon fibers, or a combination thereof; the plurality of fibers being woven into a shape that resembles the ceramic matrix composite (CMC) to be produced;
   optionally, wherein the fiber preform further comprises a fiber coating with or without subsequent rigidization with a ceramic material.

4. The method according to any of aspects 1 to 4, wherein the metal or alloy is silicon, and optionally, a ceramic is present in the form of silicon carbide.

5. The method according to aspect 4, wherein the predetermined temperature in the hot zone is about 20° C. to about 50° C. greater than the melting temperature of the metal or alloy;
   wherein temperature of the preheat zone is between about 25° C. to about 150° C. lower than the melting temperature of the metal or alloy;
   wherein the temperature of the cold zone is between about ambient or room temperature up to about 200° C. below the melting temperature of the metal or alloy.

6. The method according to any of aspects 1 to 5, wherein the preheat zone, the hot zone, and optionally, the cold zone(s) are placed under a vacuum.

7. The method according to any of aspects 1-6, wherein the combination of the fiber preform, the wick material, and the crucible are coupled with and moved by a rod, a pulley system, an actuator system, a cable, or the like, such that the predetermined rate at which the combination is moved is between about 0.4 mm/min (1 in/hr) to about 4.2 mm/min (10 in/hr).

8. The method according to any of aspects 1-7, wherein the infiltration of the molten metal or alloy into the wick material and into the fiber preform is due to capillary forces, gravity, or a combination thereof.

9. The method according to any of aspects 1-8, wherein the wick material has a larger pore size or pore volume than the fiber preform.

10. The method according to any of aspects 1-9, wherein the wick material comprises a felt material, carbon foam, a textile, or a mixture thereof.

11. The method according to any of aspects 1-10, wherein the discrete solidification gradient moves from the top to the bottom of the ceramic matrix composite (CMC) or from the bottom to the top of the CMC.

12. The method according to any of aspects 1-11, wherein the method incorporates an overall impurity level derived from the infiltration of the molten metal or alloy of less than 20 ppm.

13. A method of producing a ceramic matrix composite (CMC), the method comprising:
providing a fiber preform;
providing a reactor that comprises at least one cold zone, at least one preheat zone, and at least one hot zone; wherein the hot zone includes a molten metal or alloy bath and the hot zone, preheat zone, and optionally, the cold zone are placed under a vacuum;
permitting the fiber preform to enter the cold zone of the reactor;
transferring the fiber preform through the cold zone, the preheat zone and the hot zone at a predetermined rate;
dipping and holding the fiber preform into the molten metal bath
infiltrating the fiber preform with the metal or alloy from the molten metal bath;
withdrawing the fiber preform infiltrated with the metal or alloy from the molten metal bath;
transferring the fiber preform infiltrated with the metal or alloy from the hot zone through the preheat zone and the cold zone;
allowing the metal or alloy infiltrated in to the fiber preform solidify, thereby, forming the ceramic matrix composite (CMC); and
optionally, performing one or more finishing operations on the ceramic matrix composite (CMC);
wherein a discrete solidification front is established that moves through the ceramic matrix composite (CMC) as the composite cools.

14. The method according to aspect 13, wherein the predetermined temperature in the hot zone is about 20° C. to about 50° C. greater than the melting temperature of the metal or alloy;
wherein the temperature in the preheat zone is less than the temperature in the hot zone and the temperature in the cold zone is less than the temperature in the preheat zone.

15. The method according to any of aspects 13 or 14, wherein the fiber preform comprises a plurality of silicon carbide (SiC) fibers, silicon nitride fibers, alumina fibers, mullite fibers, zirconia fibers, carbon fibers, or a combination thereof that are woven into a shape that resembles the ceramic matrix composite (CMC) to be produced;
wherein the metal or alloy is silicon, and optionally, a ceramic is present in the form of silicon carbide.

16. The method according to any of aspects 13 to 15, wherein the fiber preform is coupled with and moved by a rod, a pulley system, an actuator system, a cable, or the like, such that the predetermined rate at which the combination is moved at least about 0.4 mm/min (1 in/hr).

17. The method according to any of aspects 13-16, wherein the cold zone, the preheat zone, and the hot zone are separated from each other by one or more thermal barriers or baffles.

18. The method according to any of aspects 13-17, wherein the fiber preform is in contact with at least one wick material, such that infiltration of the molten metal or alloy into the wick material and into the fiber preform is due to capillary forces.

19. The method according to any of aspects 13-18, wherein the discrete solidification gradient moves from the bottom to the top of the ceramic matrix composite (CMC).

20. The method according to any of aspects 13-19, wherein the method incorporates an overall impurity level derived from the infiltration of the molten metal or alloy of less than 20 ppm.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of producing a ceramic matrix composite (CMC), the method comprising:
providing a fiber preform;
providing first and second wick materials on opposing surfaces of the fiber preform such that each of the first and second wick materials is in contact with at least a portion of a top surface or a bottom surface of the fiber preform;
combining the fiber preform and the first wick material with a metal or alloy, wherein the metal or alloy is contained within a hollowed-out region of the first wick material or in a crucible;
providing a reactor that comprises a cold zone, a preheat zone, and a hot zone, wherein adjacent zones are separated from each other by one or more thermal barriers or baffles;
permitting the combination of the fiber preform, the first and second wick materials, and the crucible to enter the cold zone of the reactor;
transferring the combination of the fiber preform, the first and second wick materials, and the crucible through the cold zone, the preheat zone and the hot zone at a predetermined rate;
forming a molten metal bath from the metal or alloy while the crucible is in the hot zone;
infiltrating the first wick material and the fiber preform with the metal or alloy from the molten metal bath; and
allowing the metal or alloy that has infiltrated in to the fiber preform to solidify, thereby forming the ceramic matrix composite, wherein a discrete solidification front is established that moves through the ceramic matrix composite from the top surface to the bottom surface or from the bottom surface to the top surface as the ceramic matrix composite cools, and wherein, as the metal or alloy solidifies during the cooling, the second wick material captures excess metal or alloy, wherein the cold zone is a first cold zone, and further comprising a second cold zone downstream of the hot zone, and wherein the discrete solidification front is established when the metal or alloy begins to cool during a transition from the hot section to the second cold zone.

2. The method according to claim 1, wherein the method further comprises:

removing the first and second wick materials from being in contact with the ceramic matrix composite; and performing one or more finishing operations on the ceramic matrix composite.

3. The method according to claim 1, wherein the fiber preform comprises a plurality of silicon carbide (SiC) fibers, silicon nitride fibers, alumina fibers, mullite fibers, zirconia fibers, carbon fibers, or a combination thereof; the plurality of fibers being woven into a shape that resembles the ceramic matrix composite to be produced;

optionally, wherein the fiber preform further comprises a fiber coating with or without subsequent rigidization with a ceramic material.

4. The method according to claim 1, wherein the metal or alloy comprises silicon, and optionally, a ceramic is present in the form of silicon carbide.

5. The method according to claim 4, wherein a predetermined temperature in the hot zone is about 20° C. to about 50° C. greater than a melting temperature of the metal or alloy;

wherein a temperature of the preheat zone is between about 25° C. to about 150° C. lower than the melting temperature of the metal or alloy;

wherein a temperature of the cold zone is between about ambient or room temperature up to about 200° C. below the melting temperature of the metal or alloy.

6. The method according to claim 1, wherein the preheat zone, the hot zone, and optionally, the cold zone are placed under a vacuum.

7. The method according to claim 1, wherein the combination of the fiber preform, the first and second wick materials, and the crucible are coupled with and moved by a rod, a pulley system, an actuator system, or a cable, such that the predetermined rate at which the combination is moved is between about 0.4 mm/min (1 in/hr) to about 4.2 mm/min (10 in/hr).

8. The method according to claim 1, wherein the infiltration of the metal or alloy into the first wick material and into the fiber preform is due to capillary forces, gravity, or a combination thereof.

9. The method according to claim 1, wherein one or both of the first and second wick materials have a larger pore size or pore volume than the fiber preform.

10. The method according to claim 1, wherein one or both of the first and second wick materials comprise a felt material, carbon foam, a textile, or a mixture thereof.

11. The method according to claim 1, wherein the method incorporates an overall impurity level derived from the infiltration of the molten metal or alloy of less than 20 ppm.

* * * * *